United States Patent
Shin (10) Patent No.: US 7,437,552 B2
(45) Date of Patent: Oct. 14, 2008

(54) USER AUTHENTICATION SYSTEM AND USER AUTHENTICATION METHOD

(75) Inventor: Akihiro Shin, Tokyo (JP)

(73) Assignee: NEC Corporation, Tokyo (JP)

( * ) Notice: Subject to any disclaimer, the term of this patent is extended or adjusted under 35 U.S.C. 154(b) by 965 days.

(21) Appl. No.: 10/614,800

(22) Filed: Jul. 9, 2003

(65) Prior Publication Data

US 2004/0107364 A1  Jun. 3, 2004

(30) Foreign Application Priority Data

Jul. 10, 2002  (JP) .............................. 2002-200920

(51) Int. Cl.
*H04L 9/00* (2006.01)
*G06F 15/16* (2006.01)
*G06F 15/173* (2006.01)

(52) U.S. Cl. .................. 713/160; 713/154; 713/170; 713/180; 726/1; 726/2; 726/3; 726/4; 726/6; 726/12; 726/13; 726/14; 709/220; 709/223; 709/224; 709/226; 709/227; 709/230

(58) Field of Classification Search ................ 726/4; 713/160, 180
See application file for complete search history.

(56) References Cited

U.S. PATENT DOCUMENTS

| | | | | |
|---|---|---|---|---|
| 6,009,103 A | * | 12/1999 | Woundy | 370/401 |
| 6,075,776 A | * | 6/2000 | Tanimoto et al. | 370/254 |
| 6,748,439 B1 | * | 6/2004 | Monachello et al. | 709/229 |
| 2002/0016858 A1 | * | 2/2002 | Sawada et al. | 709/238 |
| 2003/0055893 A1 | * | 3/2003 | Sato et al. | 709/204 |

FOREIGN PATENT DOCUMENTS

| | | |
|---|---|---|
| JP | 10-173691 A | 6/1998 |
| JP | 2002-26954 A | 1/2002 |
| JP | 2002-152276 A | 5/2002 |

* cited by examiner

*Primary Examiner*—Kristine Kincaid
*Assistant Examiner*—Jenise E Jackson
(74) *Attorney, Agent, or Firm*—Sughrue Mion, PLLC (57) ABSTRACT

A subscriber's terminal 201 is configured to be connected to an internet service provided 208 via a LAN 202, and an IP subnet distribution switch 209 within a network service provider 203. When a packet signal that has not received the authentication is input, a physical-port changeover switch 204 gives a temporary IP address to the subscriber's terminal 201, and causes the subscriber's terminal 201 to employ this for making an authentication process. If the authentication succeeds, a normal IP address is given, and the packet signal, which made use of this, is distributed to a network that is an object by the IP subnet distribution switch 209.

11 Claims, 6 Drawing Sheets

PRIOR ART

FIG. 7

PRIOR ART

USER AUTHENTICATION SYSTEM AND USER AUTHENTICATION METHOD

BACKGROUND OF THE INVENTION

The present invention relates to a user authentication system and a user authentication method that is preferred at the moment that, for example, a user who selectively uses any one of a plurality of local area networks, and a user, who uses ADSL communication technology to dispatch a packet signal to an internet via a specific internet service provider, make the authentication for these networks for connection.

With arrangement and expansion of communication facilities, as is often the case, xDSL (x Digital Subscriber Line) communication technology such as an ADSL (Asymmetric Digital Subscriber Line) is used to make access to the internet in the environment of the firm connection.

Figure 6:
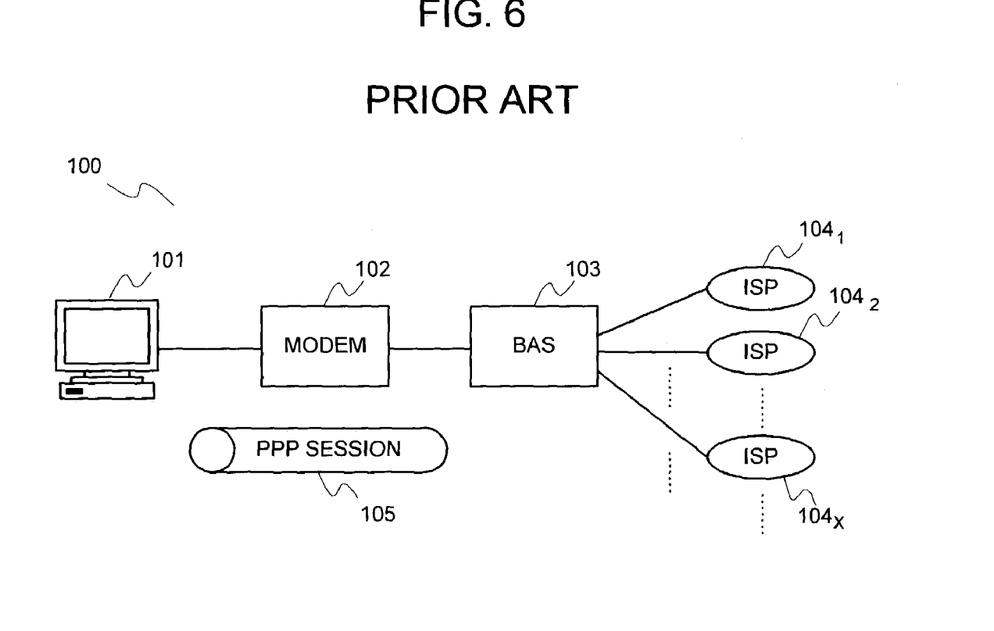
FIG. 6 is a system configuration diagram signifying an outline of a conventional communication system in which an ADSL is used to make the connection to the network service provider and FIG. 7 is a system configuration diagram signifying an outline of a conventionally proposed communication system that avoids making use of a point-to-point protocol.

FIG. 6 illustrates an outline of a conventional communication system in which the ADSL is used to make the connection to the network service provider. In this communication system 100, a communication terminal 101, which is composed of a personal computer, is connected to a broadband access server (BAS) 103 via a MODEM (modulator and demodulator) 102. The broadband access server 103 means a server to be mounted within communication station facilities, which is not shown in the figure, in order to provide the xDSL such as the ADSL, or a fast internet firm-connection service such as an FTTH (Fiber To The Home). In a normal case, the broadband access server 103 is connected to an internet network, which is not shown in the figure, via a plurality of internet service providers (ISPs) $104_1$, $104_2$, . . . .

In such a communication system 100, a point-to-point protocol over Ethernet (registered trademark) (PPPoE) session 105 is used to transfer point-to-point data from the communication terminal 101 up to the broadband access server 103. Herein, the point-to-point over Ethernet (registered trademark) protocol is a protocol for making the connection between two points to make data communication. By making use of this protocol, many protocols from a TCP/IP (Transmission Control Protocol/Internet Protocol) down can be relayed. Herein, so as to encapsulate the packet signal having an IP address incorporated, and to transfer it to the broadband access server 103 by means of the local area network such as Ethernet (registered trademark), the point-to-point protocol over Ethernet (registered trademark) session 105 is used. For example, this kind of the technology was disclosed in JP-P1998-173691A.

The broadband access server 103 decapsulates the signal sent from the communication terminal 101 over the local area network to fetch the packet signal, and transfers this to an internet service provider $104_x$ with which the communication terminal 101 struck a bargain. The internet service provider $104_x$ makes the authentication as confirmation for the principal by means of a technique requiring a password from the communication terminal 101 and the like, and if this succeeds, it comes to dispatch the packet signal sent from the communication terminal 101 to a partner that its IP address indicates.

In such a manner, in the communication system 100 shown in this FIG. 6, the point-to-point protocol, which might be originally unnecessary if the communication terminal 101 is directly connected to the internet service provider $104_x$, is used to encapsulate the packet signal for transferring. For this end, the broadband access server 103 requires works of capsulation and de-capsulation of the packet signal such as mounting and dismantling a header by the point-to-point protocol. At present time, the environment of the firm connection to the internet has rapidly been arranged, and being accompanied by this, the amount of the packet signal, which the subscriber's terminal 101 communicates through the specific internet service provider $104_x$ with which it struck a bargain, has increased. Also, due to appearance of application software suitable for the firm connection, and increase in websites, in future, the communication amount between the subscriber's terminal 101 and the internet service provider $104_x$ reliably increases more and more. In such a status, it is necessary to abolish or reduce the works of the encapsulation of the packet signal and the de-capsulation for removing the capsule, in which the point-to-point protocol was used.

Figure 7:
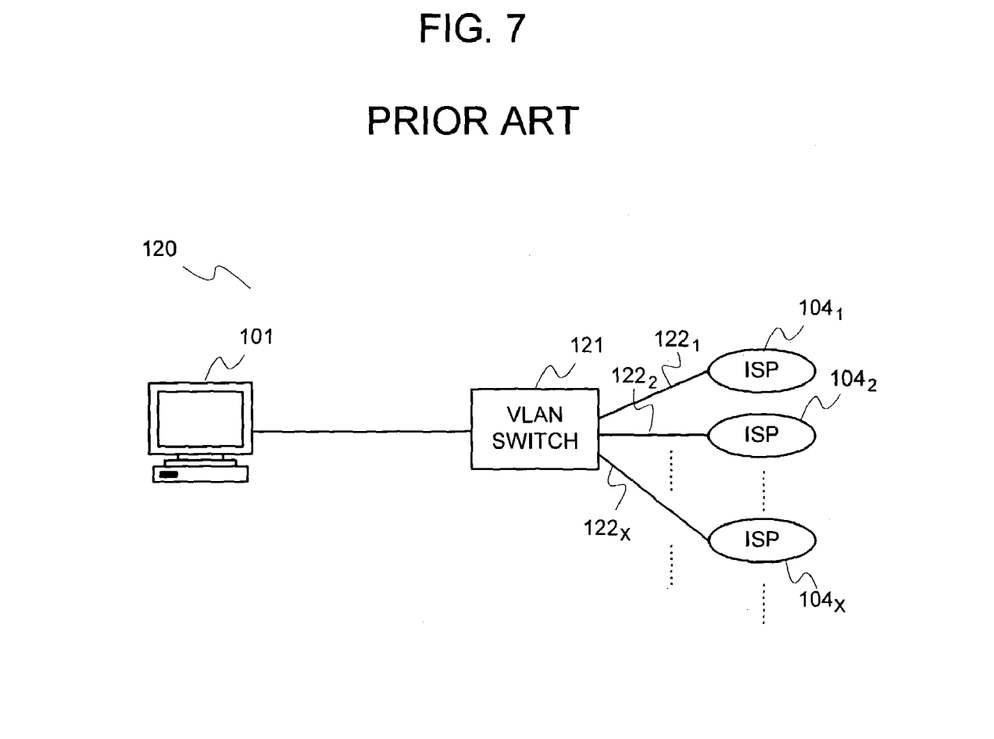

FIG. 7 illustrates an outline of the conventionally proposed communication system that avoids making use of the point-to-point protocol explained above. In this FIG. 7, the identical codes are affixed to the identical parts to FIG. 6, and this explanation is omitted properly. In this communication system 120, the communication terminal 101 is connected to a VLAN (Virtual Local Area Network) switch 121. The VLAN switch 121 is connected to an internet network, which is not shown in the figure, via a plurality of the internet service providers (ISPs) $104_1$, $104_2$, . . . by virtual/local area networks $122_1$, $122_2$, . . . . Accordingly, if it is assumed that the communication terminal 101 struck a bargain about the connection of the internet with the internet service provider $104_x$, the VLAN switch 121 makes the authentication when the communication terminal 101 logs in, and makes the connection to the internet service provider $104_x$, which is a bargain partner, if the authentication succeeds. Additionally, as to the VLAN, it was disclosed in JP-P1997-130421A etc.

In the communication system 120 shown in this FIG. 7, there is no necessity for the use of the point-to-point protocol as explained in FIG. 6. Accordingly, from a viewpoint of introducing the broadband into the communication system for the reason that too many protocol stacks exist, the system is liberated from the problem that the broadband access server 103 as the existing facilities and a router become a bottleneck. Also, after the authentication was finished, the connection is made to the virtual/local area networks $122_1$, $122_2$, . . . as a local area network that is virtual, whereby drastic improvement is expected in terms of throughput.

As mentioned above, however, the virtual/local area network is employed in this communication system 120. For this, as to the number of the virtual/local area networks to which the VLAN switch 121 can branch, the twelfth power of two, i.e. 4096 is maximum because a VLAN field of a frame to be transferred over the virtual/local area network is configured of 12 bits. As the case may be, a lot of the local area networks are incorporated responding to the departments and the physical position, for example, even within one enterprise, and in aggregating these for configuring a yet larger network, this restriction becomes a big restrain to construction of the communication system.

SUMMARY OF THE INVENTION

An objective of the present invention is to provide the user authentication system and the user authentication method in which the communication terminal can freely make the connection to the communication network via the local area network, and make the connection to the desired local area network without restrain of the number.

In the invention, a user authentication system is caused to comprising: (1) a communication terminal; (2) physical-port changeover means comprising: packet signal input means for inputting a packet signal, which was dispatched to a predetermined communication network requiring authentication from this communication terminal, on an upstream side thereof; authentication existence determination means for determining whether or not the packet signal, which this packet signal input means input, is a signal that has received the authentication of said predetermined communication network; an unauthenticated-signal port for, at the time that this authentication existence determination means determined that this was a signal that had not received the authentication yet, outputting this; and an authenticated-signal port for, at the time that this authentication existence determination means determined that this was s signal that had already received the authentication, outputting this; (3) temporary-use address offer means for, at the time that said packet signal was output from the unauthenticated-signal port of this physical-port changeover means, temporarily giving a temporary-use IP address for login to the communication terminal that dispatched its packet signal; (4) temporary-use IP address/communication terminal correspondence storage means for storing a correspondence between the temporary-use IP address, which this temporary-use address offer means offered, and the communication terminal; (5) login picture display means for, at the time that the communication terminal, which received an offer of the temporary-use IP address by said temporary-use address offer means, logged in said predetermined communication network for receiving the authentication, and its packet signal was output from the unauthenticated-signal port, inputting this for displaying a login picture; (6) authentication-propriety determination means for, at the time that the login was made from the communication terminal by using this login picture display means, determining whether or not the authentication is made for this; and (7) network address bestowal means for, at the time that this authentication-propriety determination means determined to make the authentication, giving to the communication terminal a network address for transferring the packet signal to a desired communication network that became an object of the authentication in a manner that it is caused to correspond to the communication terminal stored in the temporary-use IP address/communication terminal correspondence storage means, instead of the temporary-use IP address.

That is, the invention is configured so that the physical-port changeover means arranged on the upstream side of the predetermined communication network requiring the authentication inputs the packet signal that the communication terminal dispatched. And, determination is made as to whether this is a signal that has already received the authentication, in the event that this is a signal that has not received the authentication, the temporary-use IP address for login is temporarily given to the communication terminal that dispatched its packet signal. The communication terminal, which received the temporary-use IP address, employs this to dispatch the packet signal, which is input into the login picture display means through the unauthenticated-signal port of the physical-port changeover means, and the display of the login picture is made. The communication terminal makes the login for the authentication by means of the login picture, and the authentication-propriety determination means determines whether or not the determination is made. In the event that the determination succeeded, the network address is given for transferring the packet signal to the desired communication network, which became an object of the authentication, instead of the temporary-use IP address.

Accordingly, thereafter, communication with the desired communication network becomes possible via the authenticated-signal port of the physical-port changeover means. As to the number of the network address, there is no limit by the bit number of the VLAN field mentioned before, whereby the degree of freedom of construction of the communication system is enlarged.

Also, the destination of the packet signal is processed by means of the network address, whereby the process is simplified as compared with the technology using the point-to-point protocol, and there is no possibility that the throughput is lowered.

In the invention, the user authentication system is characterized in comprising network distribution means for, at the time that the communication terminal, to which the network address was given by the network address bestowal means, dispatched the packet signal, receiving this through the authenticated-signal port to distribute this to the corresponding communication network.

That is, in the invention, the network distribution means makes it a rule to make the distribution of the packet signal, which the communication terminal dispatched, by means of the network address.

In the invention, the user authentication system is caused to comprising: (1) a communication terminal; (2) physical-port changeover means comprising: packet signal input means for inputting a packet signal, which was dispatched to a predetermined communication network requiring authentication from this communication terminal, on the upstream side thereof; authentication existence determination means for determining whether or not the packet signal, which this packet signal input means input, is a signal that has received the authentication of said predetermined communication network; an unauthenticated-signal port for, at the time that this authentication existence determination means determined that this was a signal that had not received the authentication yet, outputting this; and an authenticated-signal port for, at the time that this authentication existence determination means determined that this was a signal that had already received the authentication, outputting this; (3) temporary-use address offer means for, at the time that the packet signal was output from the unauthenticated-signal port of this physical-port changeover means, temporarily giving a temporary-use IP address for login to the communication terminal that dispatched its packet signal; (4) temporary-use IP address/communication terminal correspondence storage means for storing a correspondence between the temporary-use IP address, which this temporary-use address offer means offered, and the communication terminal; (5) login picture display means for, at the time that the communication terminal, which received an offer of the temporary-use IP address by the temporary-use address offer means, logged in said predetermined communication network for receiving the authentication, and its packet signal was output from the unauthenticated-signal port, inputting this for displaying a login picture; (6) authentication-propriety determination means for, at the time that the login was made from the communication terminal by using this login picture display means, determining whether or not the authentication is made for this; and (7) normal IP address bestowal means for, at the time that this authentication-propriety determination means determined to make the authentication, giving to the communication terminal a normal IP address in a manner that it is caused to correspond to the communication terminal stored in the temporary-use IP address/communication terminal correspondence storage means, instead of the temporary-use IP address.

That is, the invention is configured so that the physical-port changeover means arranged on the upstream side of the predetermined communication network requiring the authentication inputs the packet signal that the communication terminal dispatched. And, determination is made as to whether this is a signal that has already received the authentication, in the event that this is a signal that has not received the authentication yet, the temporary-use IP address for login is temporarily given to the communication terminal that dispatched its packet signal. The communication terminal, which received the temporary-use IP address, employs this to dispatch the packet signal, which is input into the login picture display means through the unauthenticated-signal port of the physical-port changeover means, and the display of the login picture is made.

The communication terminal makes the login for the authentication by means of the login picture, and the authentication-propriety determination means determines whether or not the determination is made. In the event that the authentication succeeded, the normal IP address is given for transferring the packet signal to the desired communication network, which became an object of the authentication, instead of the temporary-use IP address. Accordingly, thereafter, communication with the desired communication network becomes possible via the authenticated-signal port of the physical-port changeover means. As to the number of the destination to be specified by the IP address, the number close to infinity is possible, and there is no limit by the bit number of the VLAN field mentioned before, whereby the degree of freedom of construction of the communication system is enlarged.

Also, the destination of the packet signal is processed by means of the IP address, whereby the process is simplified as compared with the technology using the point-to-point protocol, and there is no possibility that the throughput is lowered.

In the invention, the user authentication system is characterized in comprising IP subnet distribution means for, at the time that the communication terminal, to which the IP address was given by the normal IP address bestowal means, dispatched the packet signal, receiving this through the authenticated-signal port to distribute this to the corresponding IP network.

That is, in the invention, the IP subnet distribution means makes it a rule to make the distribution of the packet signal, which the communication terminal dispatched, by means of the subnet address of the IP packet.

In the invention, the authentication existence determination means comprising a user registration section having users, which received the authentication, registered, and determining whether or not the authentication for each user is made, based on whether or not the user was registered in this user registration section.

That is, in the invention, since it is necessary to make the authentication for the packet signal for which the authentication has not been made yet, it is made a rule to make its determination in the authentication existence determination means by employing the user registration section. The user registration section has already registered the authenticated user, and by retrieving this, the existence of the authentication can be determined. Employment of, for example, the MAC address allows the user to be specified.

In the invention, the user authentication system comprising employing either of the IP address or the MAC address of the communication terminal to make the distribution of the packet signal sent from the communication terminal.

That is, the invention specifies the aspect of the distribution by the IP subnet distribution means. If the IP addresses are correspondingly prepared in the communication network that is a distribution destination, respectively, only investigation of the IP address allows the determination to be made as to which communication network they are distributed to respectively. It is also possible to make the distribution by employing the MAC address of the communication terminal in addition hereto. By properly using two kinds of information with regard to the distribution in such a manner, the distribution of the packet signal can be made from different viewpoints, i.e. by the IP address to be given to individual users, and by hardware itself.

In the invention, a user authentication system is caused to comprise: (1) a communication terminal; (2) address bestowal means for, at the time that access was made from this communication terminal, giving to this the address that is accessible by an internet; and (3) authentication-time Web access means for, at the time that the communication terminal requested the authentication by making use of the address given by this address bestowal means, causing the above communication terminal to make the input operation and the display for the authentication with the Web display picture, which is displayed at the time of the internet access, taken as a picture for the authentication.

That is, in the invention, when access was made from the communication terminal, the address bestowal means makes it a rule to lose no time in giving to this the address that is accessible by the internet. And, when the communication terminal employed the given address to request the authentication, the authentication-time Web access means makes it a rule to cause the communication terminal to make the input operation and the display for the authentication with Web display picture, which is displayed at the time of the internet access, taken as a picture for the authentication. The web display picture is employed to take the procedure of the authentication in such a manner, whereby the operation for the authentication is possible by using the browser normally provided without installing special application software for the authentication on the communication terminal.

In the invention, IP subnet distribution means is characterized in distributing the packet signal to the communication network having the destination with which both of the IP address and the MAC address accorded.

That is, in the invention, the IP subnet distribution means handles the case that both of the IP address and the MAC address accorded. It becomes possible to enhance security, by deciding the distribution destination in the event that both accorded in such a manner.

In the invention, a user authentication method is caused to comprise: (1) an internet access request step of, at the moment of making access to an internet, dispatching a packet signal from a predetermined communication terminal to a network service provider connected to a local area network to make a request for access to the internet; (2) a temporary-use IP address return step of, at the time that a request was made for access to the internet in this internet access request step, returning a temporary-use IP address for login to this communication terminal; (3) an authentication request step of using the temporary-use IP address returned in this temporary-use IP address return step to dispatch from the communication terminal the packet signal of an authentication request for a specific internet service provider; (4) an authentication-propriety determination step of, based on information described in the packet signal sent in this authentication request step, determining on a network service provider side whether or not the authentication of said specific internet service provider is obtained; (5) a normal-IP-address return step of, at the time that it was determined that the authentication was obtained in this authentication-propriety determination step, returning to its communication terminal the IP address assigned for said specific internet service provider;

(6) a packet-signal-for-internet-access dispatch step of using the normal IP address returned in this normal-IP-address return step to dispatch the packet signal for internet access from the communication terminal; and (7) a packet signal distribution step of receiving the packet signal dispatched in this packet-signal-for-internet-access dispatch step to check its normal IP address, and to distribute it to said specific internet service provider.

That is, it is done in the invention that at the moment of making access to the internet, the packet signal is dispatched from the predetermined communication terminal to the network service provider connected to the local area network, a request is made for access to the internet, and the temporary-use IP address for login is returned from the network service provider side. And, this temporary-use IP address is used to dispatch from the communication terminal the packet signal of the authentication request for the specific internet service provider (the authentication request step), and based on information described in this packet signal, the network service provider side is caused to make determination as to whether or not the authentication of said specific internet service provider is obtained (the authentication-propriety determination step). At the time that it was determined in this authentication-propriety determination step that authentication was obtained, the IP address distributed for said specific internet service provider is returned as the normal address from the network service provider side to its communication terminal (the normal-IP-address return step). In this case, when the packet signal for internet access is dispatched from the communication terminal to the network service provider side by using the normal IP address (the packet-signal-for-internet-access dispatch step), the normal IP address of this packet signal is checked on the network service provider side, whereby this can be distributed to said specific internet service provider side (the packet signal distribution step). Accordingly, thereafter, communication with the desired communication network becomes possible. As to the number of the IP address, there is no limit by the bit number of the VLAN field mentioned before, whereby the degree of freedom of construction of the communication system is enlarged. Also, the destination of the packet signal is processed by means of the IP address, whereby the process is simplified as compared with the technology using the point-to-point protocol, and there is no possibility that the throughput is lowered.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

The present invention will be explained below in detail based on embodiments.

First Embodiment

Figure 1:
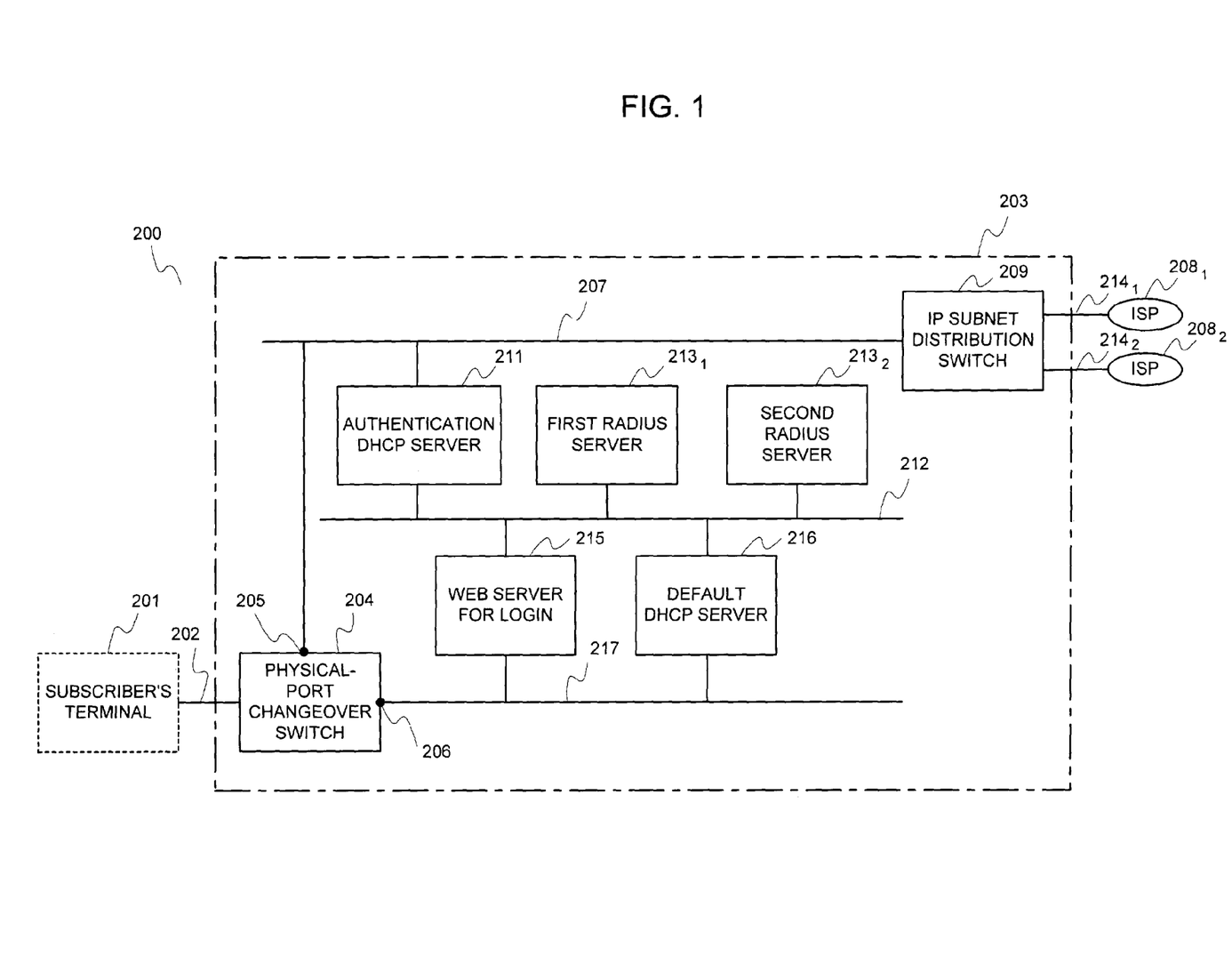
FIG. 1 is a system configuration diagram signifying a user authentication system in a first embodiment of the present invention.

FIG. 1 illustrates a user authentication system in a first embodiment of the present invention. In this user authentication system 200, a subscriber's terminal 201 is connected to a network (hereinafter, referred to as a local area network) 202 such as Ethernet (registered trademark). This local area network 202 is connected to the input side of a physical-port changeover switch 204 for changing over physical ports to be positioned within a network service provider 203. The physical-port changeover switch 204 is a switch for changing over two ports of an authenticated-signal port 205 that corresponds to a physical port for an authenticated signal, and an unauthenticated-signal port 206 that corresponds to the physical port for an unauthenticated signal. The authenticated-signal port 205 is connected to an authentication IP network 207 for transferring an IP packet after the authentication of the user was made.

The authentication IP network 207 is connected to, in this embodiment, an IP subnet distribution switch 209 for distributing the IP packet to one route out of a first internet service provider (ISP) $208_1$ and a second internet service provider $208_2$ for transmission by means of the subnet. The IP address is divided into two, i.e. a network address and a host address, and above all, what is obtained by further splitting the network address is a sub-network address. The IP subnet distribution switch 209, which checked the sub-network address in the IP address, forwards (transfers) to the first target IP network $214_1$ a frame signal dispatched from the subscriber's terminal 201 if it accords with that of a first target IP network $214_1$. To the contrary, if the network address accords with that of a second target IP network $214_2$, the IP subnet distribution switch 209 forwards this frame signal to the second target IP network $214_2$.

Also, the authentication IP network 207 is connected to one end of an authentication IP network DHCP server 211 for making the authentication of the subscriber's terminal 201. Herein, the so-called DHCP (Dynamic Host Configuration Protocol) is a protocol for dynamically assigning the IP address to each user at the time of a start and collecting this IP address at the time of a finish. The authentication IP network DHCP server 211 plays a role of delivering an MAC address of the destination source sent from the physical-port changeover switch 204 to the corresponding server out of first and second RADIUS (Remote Authentication Dialin User Service) servers $213_1$ and $213_2$, i.e. to the server in charge of the internet service provider 208, which becomes an object of the authentication, to receive the IP address, and of assigning this to the subscriber's terminal 201. In receiving a dial-up connection authentication request by a client, the corresponding server out of the first and second RADIUS servers $213_1$ and $213_2$ is adapted to return the propriety of the authentication to a client. The other end of the authentication IP network DHCP server 211 is connected to an IP network for management 212 for use in management for the authentication of the user in this user authentication system 200.

On the other hand, a default IP network 217 for inputting the packet signal, which has not received the authentication, to perform the process for the authentication is connected to the unauthenticated-signal port 206 side of the physical-port changeover switch 204. To this default IP network 217 are connected respective ends of a Web server for login 215 for causing the packet signal, which has not received the authentication, to log in, and a DHCP (Dynamic Host Configuration Protocol) server for a default IP network 216. Herein, the so-called Web server for login 215 is a server for causing the subscriber's terminal 201 to log in without installing special software by making use of software for Web page perusal generally attached at the time of purchasing a personal computer, and the like, which is charger-free or inexpensive. The DHCP server for a default IP network 216 is a server for making the dynamic assignment of the re-utilizable IP address, and specifically, a server for temporarily giving the IP address so as to cause the subscriber's terminal 201 to log in the Web server for login 215. These Web server for login 215 and DHCP server for a default IP network 216 are connected to the IP network for management 212 as well.

The IP network for management 212 is connected to the authentication IP network DHCP server 211 mentioned before, and in addition hereto, is connected to the first and second RADIUS servers $213_1$ and $213_2$ as well. In receiving the dial-up connection authentication request by the subscriber's terminal 201, these RADIUS servers $213_1$ and $213_2$ play a role of returning the propriety of the authentication to the client. Also, if the subscriber's terminal 201 is a terminal that makes the connection to the internet network through the first target IP network $214_1$ and the first internet service provider $208_1$, the first RADIUS server $213_1$ is adapted to give this the IP address that enables such distribution. To the contrary, in the event that the subscriber's terminal 201 is a terminal that makes the connection to the internet network through the second target IP network $214_2$ and the second internet service provider $208_2$, the IP address that enables such distribution is given to this.

By the way, in the user authentication system 200 of this embodiment, the physical-port changeover switch 204 receives the packet signal sent to the network services provider 203 from the subscriber's terminal 201 side via the local area network 202. And the physical-port changeover switch 204 is adapted to investigate an MAC (Media Access Control) address of the transmission source of its packet signal, and to take a changeover control of the ports responding hereto.

Figure 2:
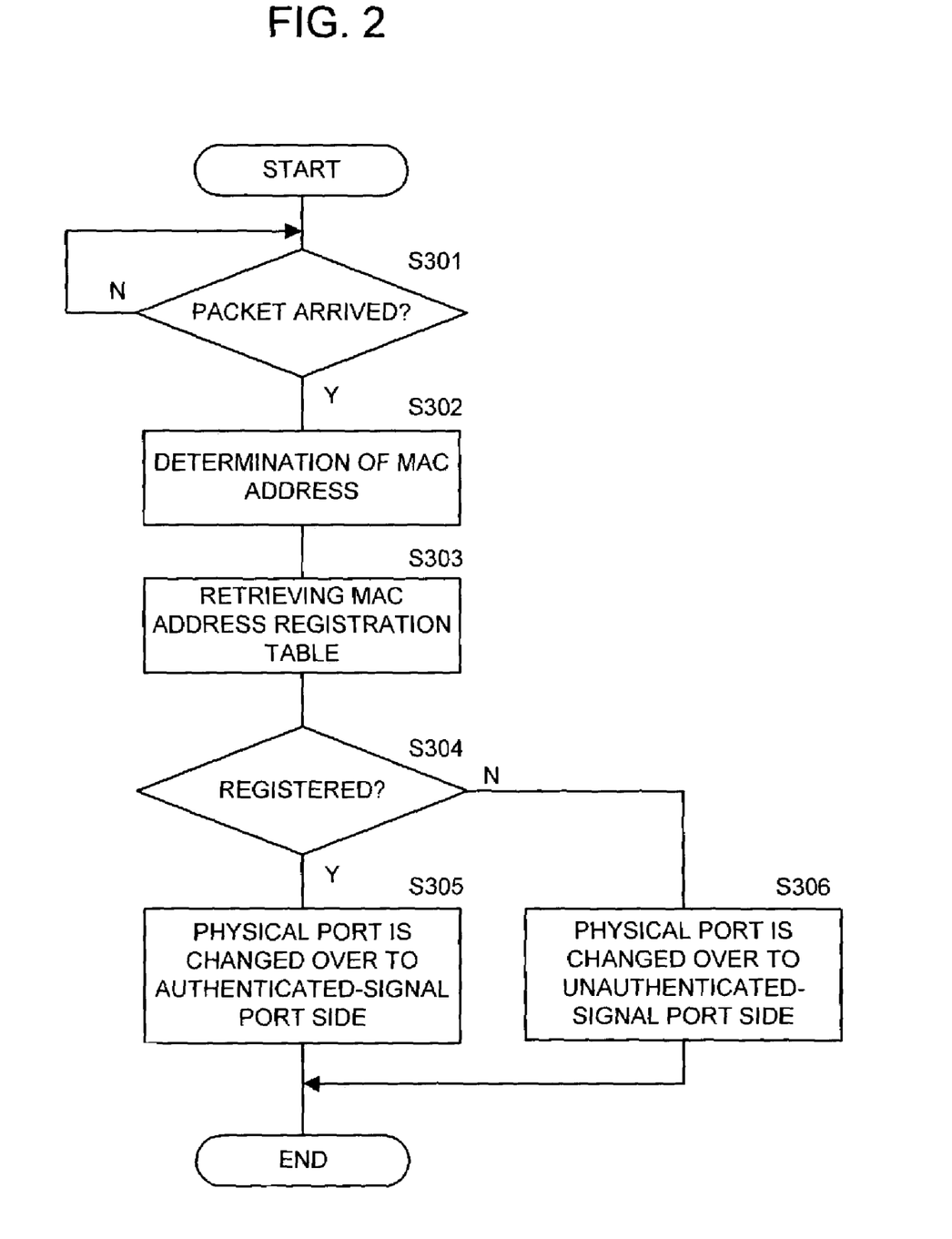
FIG. 2 is a flowchart signifying the situation of the control of a physical-port changeover switch of this embodiment.

FIG. 2 illustrates the situation of the control of this physical-port changeover switch. The physical-port changeover switch 204 shown in FIG. 1 comprises a CPU (Central Processing Unit), which is not shown in the figure, a storage medium for filing a control program, changeover means for changing over the output ports, and an MAC address registration table for registering the MAC address. When the packet signal arrives (step S301: Y), the physical-port changeover switch 204 determines its MAC address (step S302). The MAC address, which is a number to be assigned NIC (Network Interface Card) by NIC, is represented by means of 6 octets. And the retrieval is made as to whether the identical address to this MAC address was registered in the MAC address registration table (step S303).

The MAC address that received the user authentication is registered in the MAC address registration table of this embodiment. However, whatever MAC address registered once, its registration contents are deleted at the moment that it logged out. If the MAC address of the received packet signal is an address registered in the MAC address registration table (step S304: Y), the CPU mentioned before within the physical-port changeover switch 204 changes over the physical port to the authenticated-signal port 205 side (step S305), and dispatches its packet signal to the authentication IP network 207 shown in FIG. 1.

To the contrary, in the event that the MAC address of the received packet signal was not registered in the MAC address registration table (step S304: N), the CPU changes over the physical port to the unauthenticated-signal port 206 side (step S306) to dispatch its packet signal to the default IP network 217 shown in FIG. 1.

Now, assume that a user of the subscriber's terminal 201 shown in FIG. 1 struck a bargain about the connection to the internet network with the first internet service provider $208_1$. It is assumed that this user commissioned the browse of the subscriber's terminal 201 at a predetermined moment for making access to the internet, and initiated the process for the authentication request for the first internet service provider $208_1$. Thereby, the packet signal dispatched from the subscriber's terminal 201 is input into the physical-port changeover switch 204 of the network service provider 203 arranged on the upstream side of the first internet service provider $208_1$. The physical-port changeover switch 204 has not registered the MAC address of the subscriber's terminal 201 in the MAC address registration table yet at the moment that this authentication has not been made yet. Thus, the physical-port changeover switch 204 goes through the procedure for giving the provisional IP address that enables the login of the user for making the user authentication.

Figure 3:
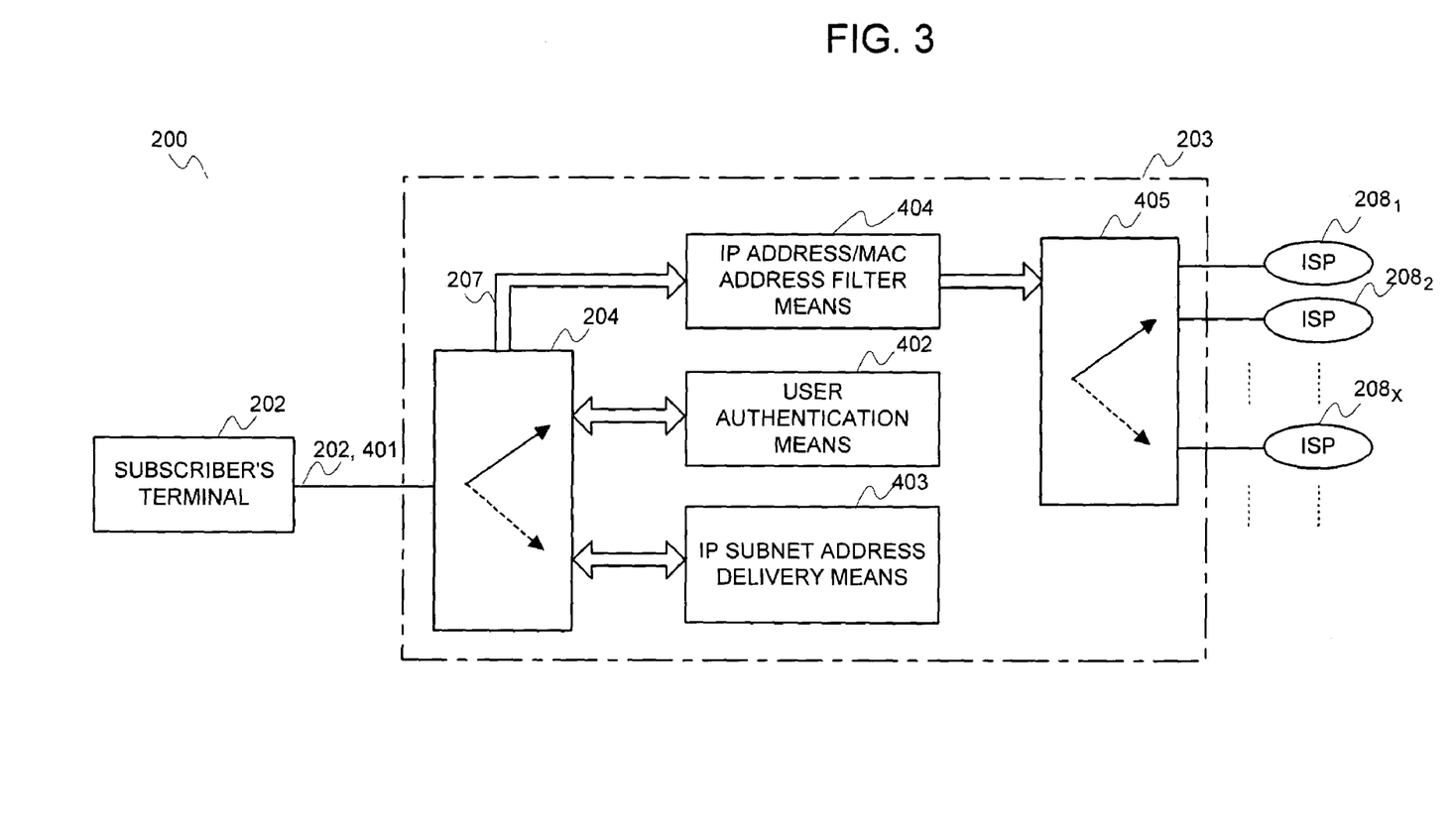
FIG. 3 is an explanatory view illustrating the principle of authentication and distribution of a packet signal in the user authentication system of this embodiment.

FIG. 3 illustrates a principle-manner configuration of the user authentication system of this embodiment. The network service provider 203 configuring the essential part of the user authentication system 200 inputs a packet signal 401 into the physical-port changeover switch 204 through the local area network 202. At this time, the authentication has not been made for making the connection of the internet between the physical-port changeover switch 204 and a predetermined internet service provider 208, whereby the former makes the connection to user authentication means 402, and initiates the procedure of the user authentication. When the user authentication succeeds in this procedure, the network service provider 203 gives its subscriber's terminal 201 the IP address. At this time, an IP subnet address delivery means 403 delivers one address for the subscriber's terminal 201 out of the IP addresses that the network service provider 203 side pre-stored. This will be specifically explained later.

Thereafter, its delivered IP address is used for the packet signal, which the subscriber's terminal 201 dispatched, on the network service provider 203 side. Thereby, the packet signal dispatched from the physical-port changeover switch 204 to the authentication IP network 207 is input into and filtered in IP address/MAC address filter means 404 to be explained later in detail, and is distributed to the specific internet service provider 208 or the communication network, which is not shown in the figure, by checking the IP sub-network address in distribution means 405. It is possible to carry out the filtering as distribution of the user by means of the IP address as well as the MAC address. Combination of both is also acceptable.

Well, after the sketchy explanation above, specific explanation will be made, beginning with a point of the process of the user authentication means 402. When the user operates the subscriber's terminal 201 for making the connection to the internet, a DHCP request packet for obtaining the IP address is dispatched from the subscriber's terminal 201.

Figure 4:
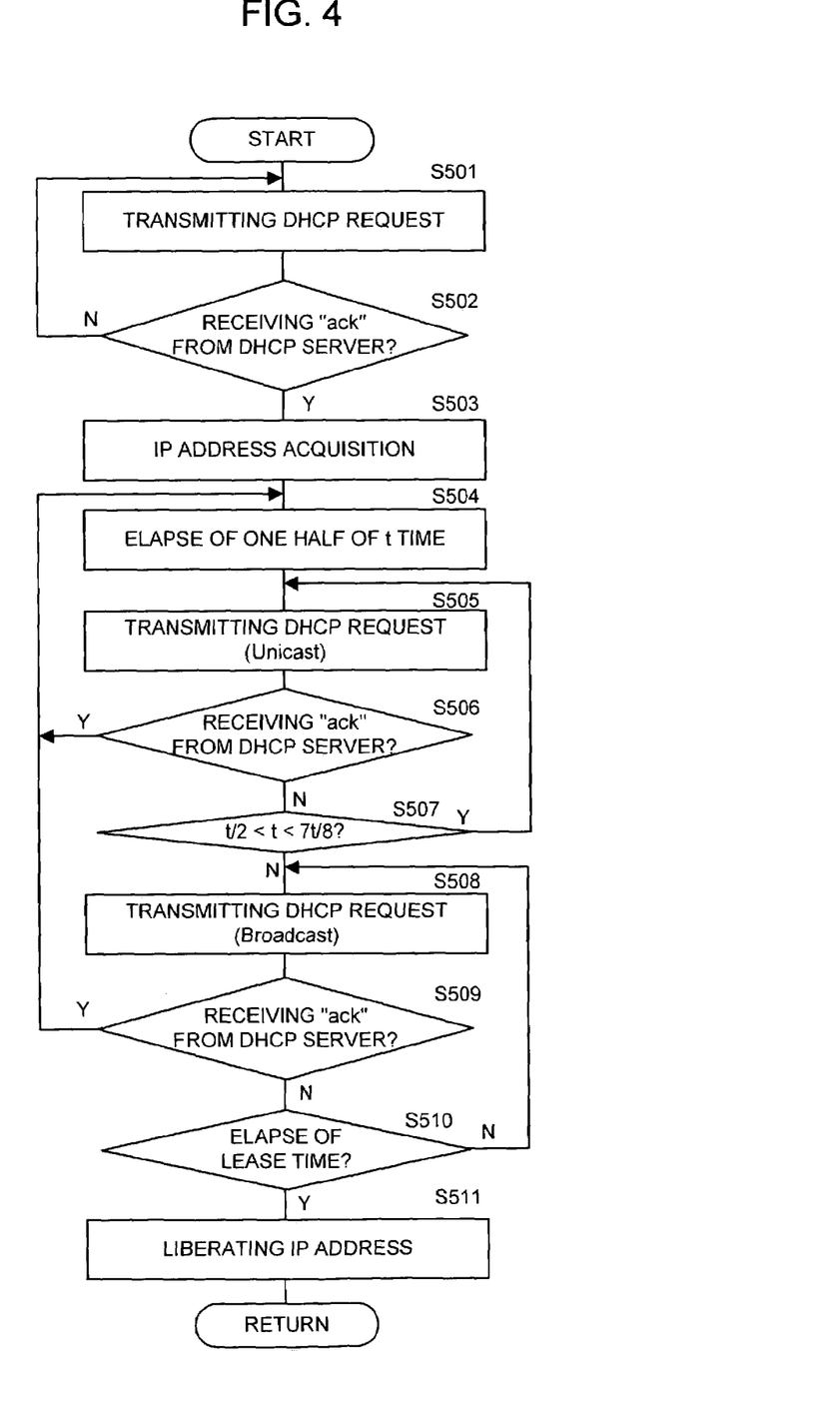
FIG. 4 is a flowchart signifying an outline of the process on a subscriber's terminal side in the user authentication system of this embodiment subsequent to the moment that a DHCP request packet was dispatched.

FIG. 4 illustrates an outline of the process on the subscriber's terminal side subsequent to the moment that the DHCP request packet was dispatched in the user authentication system of this embodiment. This will be explained together with FIG. 1. The subscriber's terminal 201 transmits the DHCP request packet by means of a broadcast frame (step S501). When the physical-port changeover switch 204 receives this, it forwards it to the default IP network 217 connected to the unauthenticated-signal port 206.

The DHCP server for a default IP network 216 accommodated in the default IP network 217 receives the DHCP request packet sent from the subscriber's terminal 201. And, it returns an "ack" signal indicating the reception thereof. Accordingly, the subscriber's terminal 201 repeats transmission of the DHCP request packet until it receives this "ack" signal (step S502: N).

The DHCP server for a default IP network 216 returns this "ack" signal; however at this time it affixes the previously prepared IP address, which is unused, hereto and transmits it to the subscriber's terminal 201. As a result, as soon as the subscriber's terminal 201 receives the "ack" signal signifying the reception of the DHCP request packet (step S502: Y), next, it obtains this IP address assigned temporarily (step S503). When the DHCP server for a default IP network 216 assigned this temporary IP address, it stores the MAC address of the subscriber's terminal 201, and the IP address assigned to this MAC address in its storage region that is not shown in the figure. Also, the IP address to be assigned at this time is an address that is leased for a limited time, whereby a lease time t is established. As one example, the lease time t is established as 5 seconds or something like it. Needless to say, the lease time t longer than this, e.g. one hour is also acceptable.

When the IP address is temporarily assigned in such a manner, the subscriber's terminal 201 employs its Web browser to make access to the Web server for login 215. The Web server for login 215 transmits picture information to be required to input a user ID and a password in an "http" (hypertext transfer protocol) procedure to the subscriber's terminal 201. Herein, the so-called "http" procedure means a procedure having the request and the reply, which were specified as a hypertext transfer protocol for HTML (Hyper Text Markup Language) transfer, combined. Transmission of the picture information allows the subscriber's terminal 201 to display the picture into which the user ID and the password are input for the authentication.

A subscriber operates the subscriber's terminal 201 in the displayed status of this picture, and inputs the user ID and the password in the "http" procedure. The Web server for login 215 delivers the IP address of the subscriber's terminal 201, which made access in the "http" procedure, to the DHCP server for a default IP network 216 via the IP network for management 212. When the DHCP server for a default IP network 216 receives the IP address of the subscriber's terminal 201, it notifies the Web server for login 215 of the MAC address of the subscriber's terminal 201 that corresponds to its IP address. When the Web server for login 215 receives notification of the MAC address of the subscriber's terminal 201, it delivers this, and the user ID and the password previously received to the corresponding server out of the first and second RADIUS servers $213_1$ and $213_2$ via the IP network for management 212 to make a request for the authentication.

Now, with regard to the first internet service provider $208_1$ with which the subscriber's terminal 201 struck a bargain about the connection of the internet, the first RADIUS server $213_1$ comes to be in charge thereof. Additionally, since the second RADIUS server $213_2$ has the basically identical configuration to that of the first RADIUS server $213_1$, explanation on its operation is omitted.

In the event of this example, the first RADIUS server $213_1$ authenticates the user ID and the password received from the Web server for login 215. And it notifies the Web server for login 215 of its result. At this time, the first RADIUS server $213_1$ stores the user ID and the MAC address in the storage region that is not shown in the figure.

The Web server for login 215 receives the authentication result from the first RADIUS server $213_1$. If the authentication fails due to the reason that the password does not accord, and the like, the Web server for login 215 directly sends the picture indicating its effect to the subscriber's terminal 201 in the "http" procedure. If the authentication succeeds, it directly sends the picture indicating that the authentication is successful to the subscriber's terminal 201 similarly in the "http" procedure. Also, in the event that the authentication is successful, the Web server for login 215 dispatches to the physical-port changeover switch 204 an instruction suggesting that, hereafter, in the event of having received the packet signal having the MAC address of the subscriber's terminal 201, this should be forwarded to the authentication IP network 207 connected to the authenticated-signal port 205.

The physical-port changeover switch 204 that received this instruction registers its MAC address in the MAC address registration table mentioned before. And, so long as the subscriber's terminal 201 does not make a lockout, when the packet signal having the identical MAC address arrived, the physical-port changeover switch 204 acts so as to forward it to the authentication IP network 207 connected to the authenticated-signal port 205.

The packet signal that the subscriber's terminal 201 dispatches to the local area network 202 in such a manner thereafter is forwarded to the authentication IP network 207 via the physical-port changeover switch 204; however the lease time of the IP address is limited. Thus, when one half of the lease time t elapsed (step S504), the subscriber's terminal 201 dispatches the DHCP request packet requiring extension of the lease (step S505). This DHCP request packet is transmitted as a unicast frame. At this moment that the temporary IP address was issued, the DHCP request packet is dispatched with the DHCP server for a default IP network 216 taken as a destination.

At the time that the "ack" signal was returned from the corresponding DHCP server for a default IP network 216 for this DHCP request (step S506: Y), its DHCP server for a default IP network 216 had already re-extended the lease time t at that moment. Accordingly, the subscriber's terminal 201 repeats the same operation whenever one half of the lease time t elapses, and thereby the lease time t can be extended many times. The purport that such a lease time t is provided is for avoiding the subscriber's terminal 201 from keeping the identical IP address, even though it makes a logout, and preventing the pre-prepared IP address from being exhausted.

By the way, there is the case that the corresponding DHCP server for a default IP network 216 does not return the "ack" signal for some reason, though the subscriber's terminal 201 dispatched the DHCP request packet requiring the extension of the lease in the step S505 (step S506: N). In such a case, until seven-eighths of the lease time t elapse (step S507: Y), the process returns to the step S505 to repeatedly dispatch the DHCP request packet by means of the unicast frame.

In the event that, even though the DHCP request packet was repeatedly dispatched in such a manner, the "ack" signal is not returned from the corresponding DHCP server for a default IP network 216 (step S507: N), at the moment that the elapse time reached seven-eighths of the lease time t (step S507: N), this time, the DHCP request packet is dispatched by means of a broadcast frame (step S508). This allows this DHCP request to be transferred to not only the DHCP server for a default IP network 216, but also the authentication IP network DHCP server 211.

In the event that the "ack" signal was returned from the authentication IP network DHCP server 211 for this DHCP request (step S509: Y), the lease time t is updated. Thereby, the process returns to the step S504. To the contrary, in such an event that the "ack" signal was not returned (step S509: N) for this, until the lease time t runs short (step S510: N), the DHCP request packet is repeatedly dispatched by means of the broadcast frame (step S508). And, at the moment that the lease time t ran short (step S510: Y), its IP address is liberated (step S511).

By the way, the authentication IP network DHCP server 211 can learn the MAC address of the subscriber's terminal 201 in the DHCP procedure. Thus, the authentication IP network DHCP server 211 delivers the MAC address of the subscriber's terminal 201 to the first RADIUS server $213_1$ in charge via the IP network for management 212, and requests it to give notice of the appropriate IP address that should be assigned to this.

When the first RADIUS server $213_1$ gets this request, it receives the MAC address of the subscriber's terminal 201 from the authentication IP network DHCP server 211, and fetches the user ID, which corresponds hereto, from the combination of the user ID and the MAC address previously stored. And, the first RADIUS server $213_1$ decides the IP address that should be assigned to this user, and notifies the authentication IP network DHCP server 211 of this decided IP address. Additionally, this IP address is an address to be delivered from among the addresses previously stocked; however the address is not limited to this. For example, it is justified to give the IP address, which the DHCP server for a default IP network 216 gave temporarily, as it stands. However, whatever IP address, which the DHCP server for a default IP network 216 gives temporarily, is acceptable so long as it is not an address with which the other IP address competes within the network service provider 203, on condition that, as to the IP address that the first RADIUS server $213_1$ and the second RADIUS server $213_2$ deliver, the identical address does not exist even outside the network service provider 203.

When the authentication IP network DHCP server 211 is notified of the IP address that should be assigned, in this example, by the first RADIUS server $213_1$, it returns an assignment notification packet giving notice that the IP address was assigned to the DHCP request by the subscriber's terminal 201.

By the way, when the IP packets are sent from the authentication IP network 207, the IP subnet distribution switch 209 checks the IP sub-network addresses of the IP packets, and so as to forward them to the respective corresponding IP networks, statically establishes the correspondence thereof. As a result, for example, if the IP packet of the sub-network address, which accorded with the sub-network of the first target IP network $214_1$, arrives, the IP subnet distribution switch 209 forwards this to the first target IP network $214_1$. Also, if the IP packet of the sub-network address, which accorded with the sub-network of the second target IP network $214_2$, arrives, the IP subnet distribution switch 209 comes to forward this to the second target IP network $214_2$.

In the previous example, the subscriber's terminal 201 struck with the first internet service provider $208_1$ about the access to the internet. Accordingly, the first RADIUS server $213_1$ gives the IP address for the subscriber's terminal 201. The packet signal of this IP address is sent to the first internet service provider $208_1$ of the first target IP network $214_1$ by the IP subnet distribution switch 209, and is transferred to the internet network, which is not shown in the figure, via this.

Second Embodiment

Figure 5:
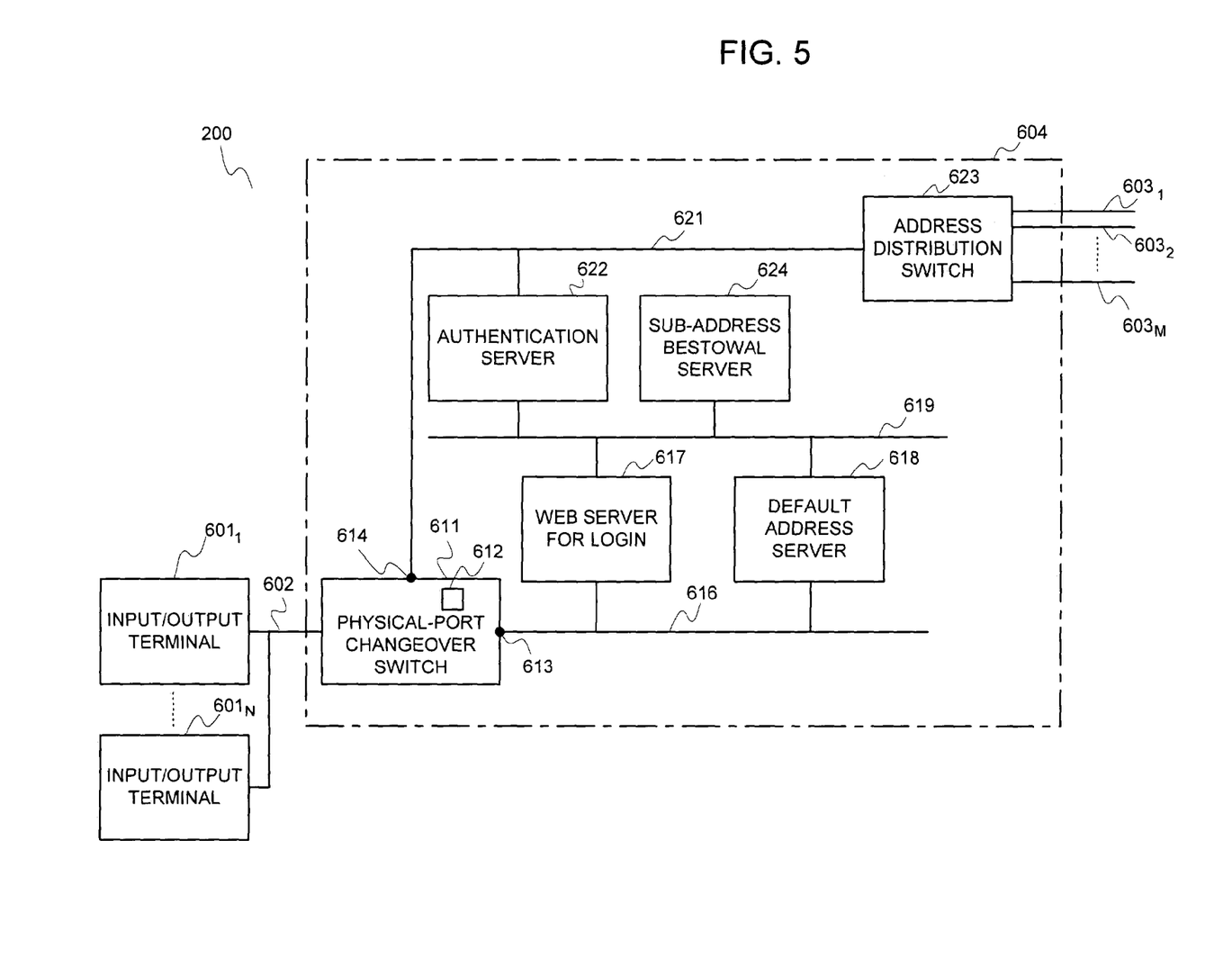
FIG. 5 is a system configuration diagram signifying the user authentication system in a second embodiment of the present invention.

FIG. 5 illustrates the user authentication system in a second embodiment of the present invention. This user authentication system 600 is a user authentication system adapted so that a given company distributes to each of company personnel and cooperative company staff the local area network that is accessible. The user authentication system 600 is configured of first to n-th input/output terminals $601_1$ to $601_N$ each of which is composed of a personal computer, a local area network (LAN) for general use within a company 602 connected hereto in common, first to m-th by-specialty local area networks for a special purpose or application $603_1$ to $603_M$, and an authentication/distribution apparatus 604 for making the authentication and the distribution for these first to m-th by-specialty local area networks $603_1$ to $603_M$.

Herein, the authentication/distribution apparatus 604 comprises a physical-port changeover switch 611 connected to the local area network for general use within a company 602. The physical-port changeover switch 611 comprises a user registration table 612 for registering a list of the users for which the authentication was made. The user registration table 612 is adapted so that, when the user made a request for logging in a specific one out of the first to m-th by-specialty local area networks $603_1$ to $603_M$, and the authentication succeeded, it is registered, and when it logged out from the by-specialty local area networks 603, its registration is erased.

The physical-port changeover switch 611 comprises an unauthenticated-signal port 613 and an authenticated-signal port 614 similar to that of the previous embodiment in addition to the user registration table 612. When access was made from the user that was not registered in the user registration table 612, the unauthenticated-signal port 613 is selected, and the packet of the broadcast address that was sent is transferred to a network for an unauthenticated signal 616 connected to this unauthenticated-signal port 613. A Web server for login 617 and a default address server 618 are connected to the network for an unauthenticated signal 616. These Web server for login 617 and default address server 618 are connected to a network for management 619 as well.

On the other hand, a network for an authenticated signal 621 is connected to the authenticated-signal port 614. To the network for an authenticated signal 621 are connected an authentication server 622 for making the authentication for logging in any desired local area network of the first to m-th by-specialty local area networks $603_1$ to $603_M$ by the user, and an address distribution switch 623. The address distribution switch 623 is adapted to distribute and dispatch this packet signal to any one of the first to m-th by-specialty local area networks $603_1$ to $603_M$ responding to the sub-address of the packet signal sent from the user. The authentication server 622 is connected to the network for management 619 as well. Also, a sub-address bestowal server 624 in addition hereto is connected to the network for management 619. The sub-address bestowal server 624 is adapted to give the user of the authenticated packet signal the sub-address that responded to the by-specialty local area networks 603 that the user desired.

Explanation will made, by taking as an example the case that, in such a user authentication system 600, for example, a user A who is a research worker of an optical fiber makes access to the first by-specialty local area networks $603_1$ that collected technical information associated with the optical fiber within the company. The user A causes magnetic information of his/her own personnel certificate to be read off by a magnetic information read device connected to any one of the first to n-th input/output terminals $601_1$ to $601_N$, which is not shown in the figure. The packet signal that incorporated this information is input into the physical-port changeover switch 611 of the authentication/distribution apparatus 604.

The physical-port changeover switch 611 retrieves the user registration table 612 with the read information of a magnetic card incorporated into this packet signal taken as a key, and learns that this is a signal that has not received the authentication yet. Then, this packet signal is transferred from the unauthenticated-signal port 613 to the network for an unauthenticated signal 616. When the default address server 618 receives this packet signal, it issues to the user A the IP address that corresponds temporarily. This IP address is returned to the user A who is a transmission source of the packet signal. The user A transmits the packet signal, which made use of this IP address, for the authentication request, and the picture for the authentication by a general browser is displayed by the Web server for login 17. The user A inputs the name of the desired first by-specialty local area networks $603_1$ in which he/she logs, and his/her own password in this condition.

This input information is given to the authentication server 622 together with the magnetic information previously mentioned. The authentication server 622 makes a reference to a table having an access right of each of the company personnel to respective first to m-th by-specialty local area networks $603_1$ to $603_M$ listed, and decides the propriety of the authentication. When the authentication succeeded, the sub-address bestowal server 624 establishes the sub-address for the user A that corresponded to the first by-specialty local area networks $603_1$ that the user A desired. This sub-address is returned to the user A through the local area network for general use within a company 602 together with the notification of the authentication success. Also, the user A is registered in the user registration table 612 at the moment that the authentication succeeded.

Hereafter, when the user A dispatches the packet signal addressed to the first by-specialty local area networks $603_1$, the physical-port changeover switch 611 dispatches this from the authenticated-signal port 614 to the network for an authenticated signal 621. This packet signal is input into the address distribution switch 623. The address distribution switch 623, which checked the sub-address of the packet signal, comes to transfer this packet signal to the first by-specialty local area networks $603_1$.

Additionally, the process of employing the sub-address of the IP address, which was given, to sort out the target IP network was performed in the first embodiment explained above; however it is also possible that the MAC address of its packet signal is used together therewith, for example, for making the distribution of the packet signal to the communication network having the destination with which both accord. This allows the situation that the third person carelessly invades the IP network to be avoided, and security to be enhanced, as compared with the case that only the IP address was used.

Also, the sub-address of the IP address, which was given, was employed to make the distribution of the packet signal in the first embodiment; however it is also possible to make the distribution only by means of the MAC address.

As explained above, in accordance with the invention, the configuration was made so that the physical-port changeover means arranged on the upstream side of the predetermined communication network requiring the authentication input the packet signal that the communication terminal dispatched, in the event that this is not a signal that has received the authentication, the temporary-use IP address for login was temporarily given to the communication terminal that dispatched its packet signal, and the picture display at the moment of the login was made in the login picture display means. This makes the login operation possible, by using the browser generally provided in the communication terminal for displaying information over the internet. That is, there is no necessity for installing special software for login in the communication terminal. Also, in the event that the authentication succeeded, the network address for transferring the packet signal to the desired communication network that became an object of the authentication is given instead of the temporary-use IP address, whereby thereafter, the communication with the desired communication network becomes possible via the authenticated-signal port of the physical-port changeover means. As to the number of the network address, there is no limit by the bit number of the VLAN field mentioned before, whereby the degree of freedom of construction of the communication system is enlarged. Also, the destination of the packet signal is processed by means of the network address, whereby the process is simplified as compared with the technology using the point-to-point protocol, and there is no possibility that the throughput is lowered.

Also, in accordance with the invention, the network distribution means is provided, whereby the distribution of the packet signal can be easily made, by the fact that the communication terminal makes use of the given network address.

Furthermore, in accordance with the invention, the configuration was made so that the physical-port changeover means arranged on the upstream side of the predetermined communication network requiring the authentication input the packet signal that the communication terminal dispatched, in the event that this is not a signal that has received the authentication, the temporary-use IP address for login is temporarily given to the communication terminal that dispatched its packet signal, and the picture display at the moment of the login was made in the login picture display means. This makes the login operation possible, by using the browser generally provided in the communication terminal for displaying information over the internet. That is, there is no necessity for installing special software for login in the communication terminal. Also, in the event that the authentication succeeded, the normal IP address is given instead of the temporary-use IP address, whereby thereafter, the communication with the desired communication network becomes possible via the authenticated-signal port of the physical-port changeover means. As to the number of the IP address, there is no limit by the bit number of the VLAN field mentioned before, whereby the degree of freedom of construction of the communication system is enlarged. Also, the destination of the packet signal is processed by means of the network address, whereby the process is simplified as compared with the technology using the point-to-point protocol, and there is no possibility that the throughput is lowered.

Also, in accordance with the invention, the IP subnet distribution means is provided, whereby the distribution of the packet signal can be simply made, by the fact the communication terminal makes use of the given IP address.

Furthermore, in accordance with the invention, the IP subnet distribution means makes the distribution of the packet signal sent from the communication terminal by employing either of the IP address or the MAC address of the communication terminal, whereby the distribution of the packet signal can be made from the different viewpoints.

Also, in accordance with the invention, when access was made from the communication terminal, the address, which is accessible by the internet, is given to this, and the Web display picture is used to take the procedure for the authentication, whereby the operation for the authentication is possible, by employing the browser normally provided, without installing special application software for the authentication in the communication terminal.

Furthermore, in accordance with the invention, the IP subnet distribution means made it a rule to decide the distribution destination of the packet signal by the fact that the IP address and the MAC address both accorded, whereby it becomes possible to enhance the security for access.

Also, in accordance with the invention, it was made a rule to return the temporary-use IP address to the communication terminal in the temporary-use IP address return step, and to cause the communication terminal to make use of this for making the authentication request, whereby, by making use of this temporary-use IP address, the procedure for the authentication can be easily performed on the upstream side of the internet service provider. Also, by previously distributing the IP address for individual internet service providers, reading the IP address of the packet signal sent from the communication terminal side allows the determination to be easily made as to which internet service provider the packet signal is distributed to, the process is simplified as compared with the technology using the point-to-point protocol, and there is no possibility that the throughput is lowered. Besides, as to the number of the IP address, there is no limit by the bit number of the VLAN field mentioned before, whereby the degree of freedom of construction of the communication system is enlarged.

What is claimed is:

1. A user authentication system comprising:
    a communication terminal;
    address bestowal means for, at the time that access was made from the communication terminal, giving to the communication terminal a temporary address that is accessible by an internet;
    authentication-time Web access means for, at the time that said communication terminal made use of the temporary address given by the address bestowal means to request authentication, causing said communication terminal to make an input operation on a Web display picture, which is displayed at the time of internet access, taken as a picture for the authentication;
    authentication means for authenticating the user terminal in response to the input operation; and
    normal-IP-address bestowal means for giving to the communication terminal a normal IP address in response to the authentication means determining that the communication terminal is authenticated,
    wherein said address bestowal means and said authentication means are connected through an IP management network which facilitates authentication of the communication terminal to the predetermined network.

2. A user authentication method comprising:
    an internet access request step of dispatching a packet signal to a network service provider connected to a local area network to make a request for access to an internet;
    temporary-use IP address return step of returning a temporary-use IP address to a communication terminal that dispatched the packet signal;
    an authentication request step of using the temporary-use IP address to dispatch the packet signal of an authentication request for a specific internet service provider from said communication terminal;
    an authentication-propriety determination step of, based on information described in the packet signal sent in this authentication request step, determining on a network service provider side whether or not authentication of said specific internet service provider is obtained;
    a normal-IP-address return step of, at the time that it was determined in this authentication-propriety determination step that the authentication was obtained, returning to the communication terminal a normal IP address assigned for said specific internet service provider;
    a packet-signal-for-internet-access dispatch step of using the normal IP address to dispatch the packet signal for internet access from said communication terminal; and
    a packet signal distribution step of receiving the packet signal dispatched in the packet-signal-for-internet-access dispatch step and checking said normal IP address thereof, and distributing the packet signal to said specific internet service provider,
    wherein said authentication request step dispatches the packet signal of the authentication request for the specific internet service provider to the requested internet network service provided through an IP management network.

3. A user authentication system comprising:
    a communication terminal;
    physical-port changeover means comprising:
    packet signal input means for inputting a packet signal dispatched to a predetermined communication network from the communication terminal and requiring an authentication from the predetermined communication network, on an upstream side thereof,
    authentication existence determination means for determining whether or not the input packet signal has received the authentication of said predetermined communication network,
    an unauthenticated-signal port for outputting the input packet signal to a default network in response to a determination by the authentication existence determination means that the input packet signal does not have a required authentication,
    an authenticated-signal port for outputting the input packet signal to an authentication network in response to a determination by the authentication existence determination means that the input packet signal has the required authentication;
    temporary-use address offer means for giving a temporary-use IP address for login to the communication terminal in response to the outputting of the input packet signal to the default network by the unauthenticated signal port;
    temporary-use IP address/communication terminal correspondence storage means for storing a correspondence between the temporary-use IP address and the communication terminal to which the temporary-use IP address was given;
    login picture display means for inputting the packet signal dispatched by the communication terminal using the temporary-use IP address to login to the predetermined communication network, and for displaying a login picture;
    authentication-propriety determination means for, at the time that the login was made from said communication terminal by using this login picture display means, determining whether or not the authentication is made for the communication terminal; and
    network address bestowal means for giving to the communication terminal a network address for transferring the signal packet to a desired communication network in response to the authentication-propriety determination means determining that the authentication has been made, and changing the correspondence between the communication terminal stored in said temporary-use IP address/communication terminal correspondence storage means to the network address from the temporary-use IP address, wherein said temporary-use address offer means and said authentication-propriety determination means are connected through an IP management network which facilitates authentication of the communication terminal to the predetermined network.

4. The user authentication system according to claim 3 further comprising network distribution means for receiving a packet signal through said authenticated-signal port and distributing the packet signal to the corresponding communication network, wherein said packet signal was dispatched from said communication terminal that was given the network address by said network address bestowal means.

5. The user authentication system according to claim 3, wherein said authentication existence determination means comprises a user registration section for storing information corresponding to registered users, who received the authentication, and means for determining whether or not the authentication for each user was made, based on whether or not the user was registered in this user registration section.

6. A user authentication system comprising:

a communication terminal;

physical-port changeover means comprising:

packet signal input means for inputting a packet signal dispatched to a predetermined communication network from the communication terminal and requiring an authentication from the predetermined communication network, on an upstream side thereof, authentication existence determination means for determining whether or not the input packet signal has received the authentication of said predetermined communication network, an unauthenticated-signal port for outputting the input packet signal to a default network in response to a determination by the authentication existence determination means that the input packet signal does not have a required authentication, an authenticated-signal port for outputting the input packet signal to an authentication network in response to a determination by the authentication existence determination means that the input packet signal has the required authentication;

temporary-use address offer means for giving a temporary-use IP address for login to the communication terminal in response to the outputting of the input packet signal to the default network by the unauthenticated signal port;

temporary-use IP address/communication terminal correspondence storage means for storing a correspondence between the temporary-use IP address and the communication terminal to which the temporary-use IP address was given;

login picture display means for inputting the packet signal dispatched by the communication terminal using the temporary-use IP address to login to the predetermined communication network, and for displaying a login picture;

authentication-propriety determination means for, at the time that the login was made from said communication terminal by using this login picture display means, determining whether or not the authentication is made for the communication terminal; and normal-IP-address bestowal means for giving to the communication terminal a normal IP address in response to the authentication-propriety determination means determining that the authentication has been made, and changing a correspondence between the communication terminal stored in said temporary-use IP address/communication terminal correspondence storage means to the normal IP address from the temporary-use IP address, wherein said temporary-use address offer means and said authentication-propriety determination means are connected through an IP management network which facilitates authentication of the communication terminal to the predetermined network.

7. The user authentication system according to claim 6, further comprising IP subnet distribution means for receiving a packet signal through the authenticated-signal port dispatched from the communication terminal that was given the normal IP address and distributing the packet signal to the corresponding communication network.

8. The user authentication system according to claim 6, wherein said authentication existence determination means comprises a user registration section for storing information corresponding to registered users, who received the authentication, and means for determining whether or not the authentication for each user was made, based on whether or not the user was registered in this user registration section.

9. The user authentication system according to claim 7, said user authentication system characterized in that said IP sub-network distribution means employs either the IP address or an MAC address of said communication terminal to make distribution of the packet signal sent from the communication terminal.

10. The user authentication system according to claim 7, said user authentication system characterized in that said IP subnet distribution means distributes the packet signal to a communication network having a destination with which both of said IP address and an MAC address accorded.

11. The user authentication system of claim 3, wherein the temporary-use IP address is different from the network address.

* * * * *